United States Patent
Lee

(10) Patent No.: US 10,841,954 B2
(45) Date of Patent: Nov. 17, 2020

(54) DEVICE OF HANDLING A RANDOM ACCESS PROCEDURE

(71) Applicant: ACER INCORPORATED, New Taipei (TW)

(72) Inventor: Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/867,728

(22) Filed: Jan. 11, 2018

(65) Prior Publication Data

US 2018/0206273 A1 Jul. 19, 2018

Related U.S. Application Data

(60) Provisional application No. 62/445,759, filed on Jan. 13, 2017.

(51) Int. Cl.
*H04W 74/08* (2009.01)
*H04W 74/00* (2009.01)
(Continued)

(52) U.S. Cl.
CPC ..... *H04W 74/0833* (2013.01); *H04W 72/042* (2013.01); *H04W 72/048* (2013.01);
(Continued)

(58) Field of Classification Search
CPC ........... H04W 74/0833; H04W 74/008; H04W 74/006; H04W 72/048; H04W 72/1273;
(Continued)

(56) References Cited

U.S. PATENT DOCUMENTS

2013/0039195 A1* 2/2013 Weng .................... H04W 48/20
370/252
2013/0301619 A1* 11/2013 Singh .................. H04W 56/004
370/336
(Continued)

FOREIGN PATENT DOCUMENTS

EP 2 563 073 A1 2/2013
EP 2 986 075 A1 2/2016
(Continued)

OTHER PUBLICATIONS

European search opinion, dated May 17, 2018, Global Dossier, [retrieved on Mar. 13, 2019] Retrieved from Internet <URL: https://opd-ui.uspto.gov/#/docurnent-page/EP:18151550:A> (Year: 2018).*
(Continued)

*Primary Examiner* — Omar J Ghowrwal
(74) *Attorney, Agent, or Firm* — Winston Hsu

(57) ABSTRACT

A communication device for handling a random access (RA) procedure comprises a storage device for storing instructions and a processing circuit coupled to the storage device. The processing circuit is configured to execute the instructions stored in the storage device. The instructions comprise determining a RA sequence according to a synchronization signal (SS) transmitted via a downlink (DL) beam by a serving cell; transmitting the RA sequence on a RA resource to the serving cell; and receiving a RA response (RAR) in response to the RA sequence from the serving cell, wherein the RAR is scheduled by a DL control information (DCI) in a control resource.

24 Claims, 4 Drawing Sheets

(51) Int. Cl.
*H04W 72/04* (2009.01)
*H04W 72/12* (2009.01)
*H04W 48/12* (2009.01)
*H04W 56/00* (2009.01)

(52) U.S. Cl.
CPC ... *H04W 72/0446* (2013.01); *H04W 72/1273* (2013.01); *H04W 74/006* (2013.01); *H04W 74/008* (2013.01); *H04W 48/12* (2013.01); *H04W 72/046* (2013.01)

(58) Field of Classification Search
CPC ........... H04W 72/0446; H04W 72/042; H04W 72/046; H04W 48/12; H04W 72/1284; H04W 56/00
See application file for complete search history.

(56) References Cited

U.S. PATENT DOCUMENTS

| | | |
|---|---|---|
| 2014/0376466 A1 | 12/2014 | Jeong |
| 2016/0302230 A1* | 10/2016 | Novlan ............... H04W 40/244 |
| 2017/0141833 A1 | 5/2017 | Kim |
| 2018/0098235 A1 | 4/2018 | Bagheri |
| 2018/0103504 A1 | 4/2018 | Quan |
| 2018/0199322 A1 | 7/2018 | Takeda |
| 2018/0241458 A1* | 8/2018 | Jung ....................... H04B 7/024 |
| 2018/0309533 A1* | 10/2018 | Yoshimoto .......... H04L 27/2613 |
| 2019/0052331 A1* | 2/2019 | Chang .................. H04B 7/0619 |
| 2019/0159255 A1* | 5/2019 | Zheng ............... H04W 74/0808 |
| 2019/0274168 A1* | 9/2019 | Hwang ............... H04L 27/2602 |
| 2020/0059967 A1* | 2/2020 | Kim ...................... H04L 5/0023 |
| 2020/0128585 A1* | 4/2020 | Kuang ................... H04W 8/22 |

FOREIGN PATENT DOCUMENTS

| | | |
|---|---|---|
| WO | 2014/139174 A1 | 9/2014 |
| WO | 2016/061382 A1 | 4/2016 |
| WO | 2016/086144 A1 | 6/2016 |
| WO | 2016/117981 A1 | 7/2016 |

OTHER PUBLICATIONS

Motorola Mobility, CSI aspects of shortened TTI, 3GPP TSG RAN WG1#87, R1-1612743, Nov. 14-19, 2016, Reno, USA, XP051176685.
Huawei, HiSilicon, Discussion on CSI feedback for short TTI, 3GPP TSG RAN WG1 Meeting #87, R1-1611166, Reno, USA, Nov. 14-18, 2016, XP051175147.
NTT DOCOMO, Inc., Views on CSI feedback for shortened TTI with reduced processing time, 3GPP TSG RAN WG1 Meeting #87, R1-1612699, Reno, USA, Nov. 14-18, 2016, pp. 1-7, XP051176642.
Motorola Mobility, Control signalling for shortened TTI, 3GPP TSG RAN WG1#87, R1-1612741, Nov. 14-19, 2016, Reno, USA, XP051176684.

* cited by examiner

DEVICE OF HANDLING A RANDOM ACCESS PROCEDURE

CROSS REFERENCE TO RELATED APPLICATIONS

This application claims the benefit of U.S. Provisional Application No. 62/445,759 filed on Jan. 13, 2017, which is incorporated herein by reference.

BACKGROUND OF THE INVENTION

1. Field of the Invention

The present invention relates to a communication device and a method used in a wireless communication system, and more particularly, to a communication device and a method of handling a random access procedure.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

In addition, beamforming is proposed to further improve the performance of the wireless communication system. In this situation the eNB uses beams with narrow beam widths to communicate with the UE. The UE may receive signals in only one of the beams according to its location. Accordingly, a random access (RA) procedure proposed in the prior art may not be performed successfully, when the eNB operates the beamforming. Thus, how to perform the RA procedure with when the beamforming is operated is an important problem to be solved.

SUMMARY OF THE INVENTION

The present invention therefore provides a method and related communication device for handling a random access procedure to solve the abovementioned problem.

A communication device for handling a random access (RA) procedure comprises a storage device for storing instructions and a processing circuit coupled to the storage device. The processing circuit is configured to execute the instructions stored in the storage device. The instructions comprise determining a RA sequence according to a synchronization signal (SS) transmitted via a downlink (DL) beam by a serving cell; transmitting the RA sequence on a RA resource to the serving cell; and receiving a RA response (RAR) in response to the RA sequence from the serving cell, wherein the RAR is scheduled by a DL control information (DCI) in a control resource.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
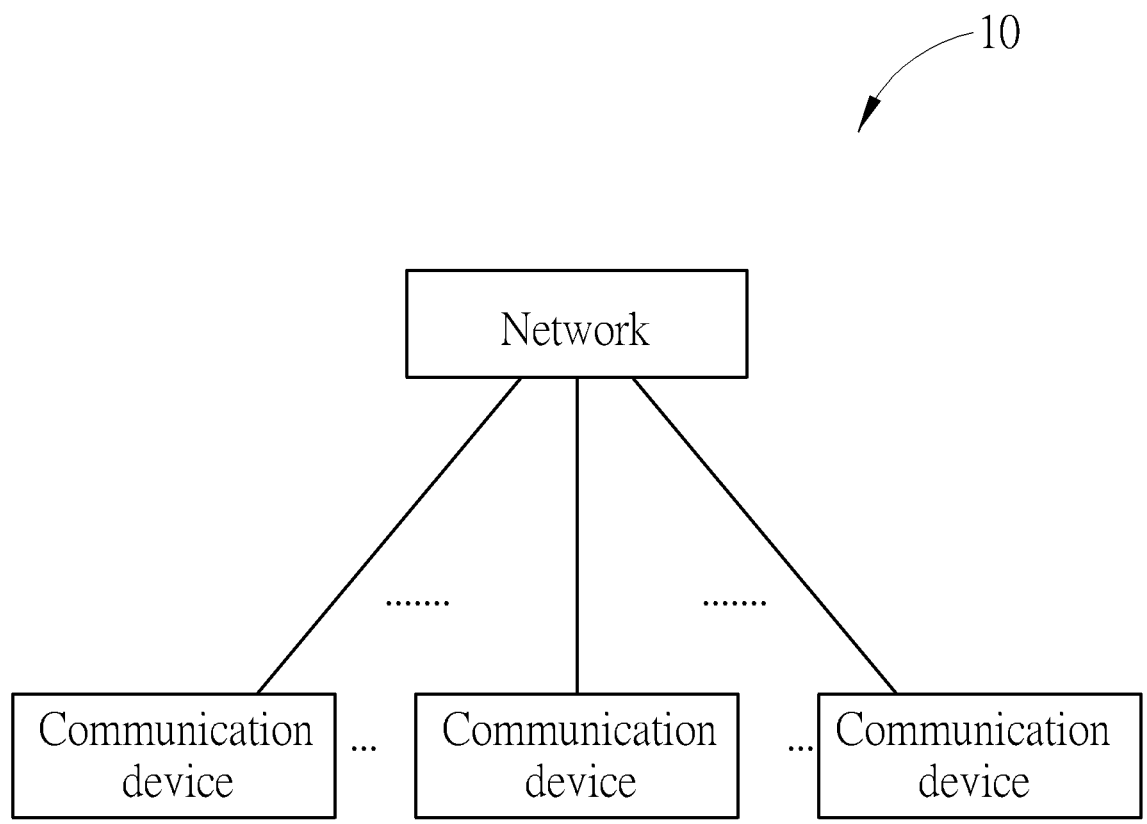
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NR-RAN) including at least one eNB, at least one next generation NB (gNB) and/or at least one fifth generation (5G) base station (BS).

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
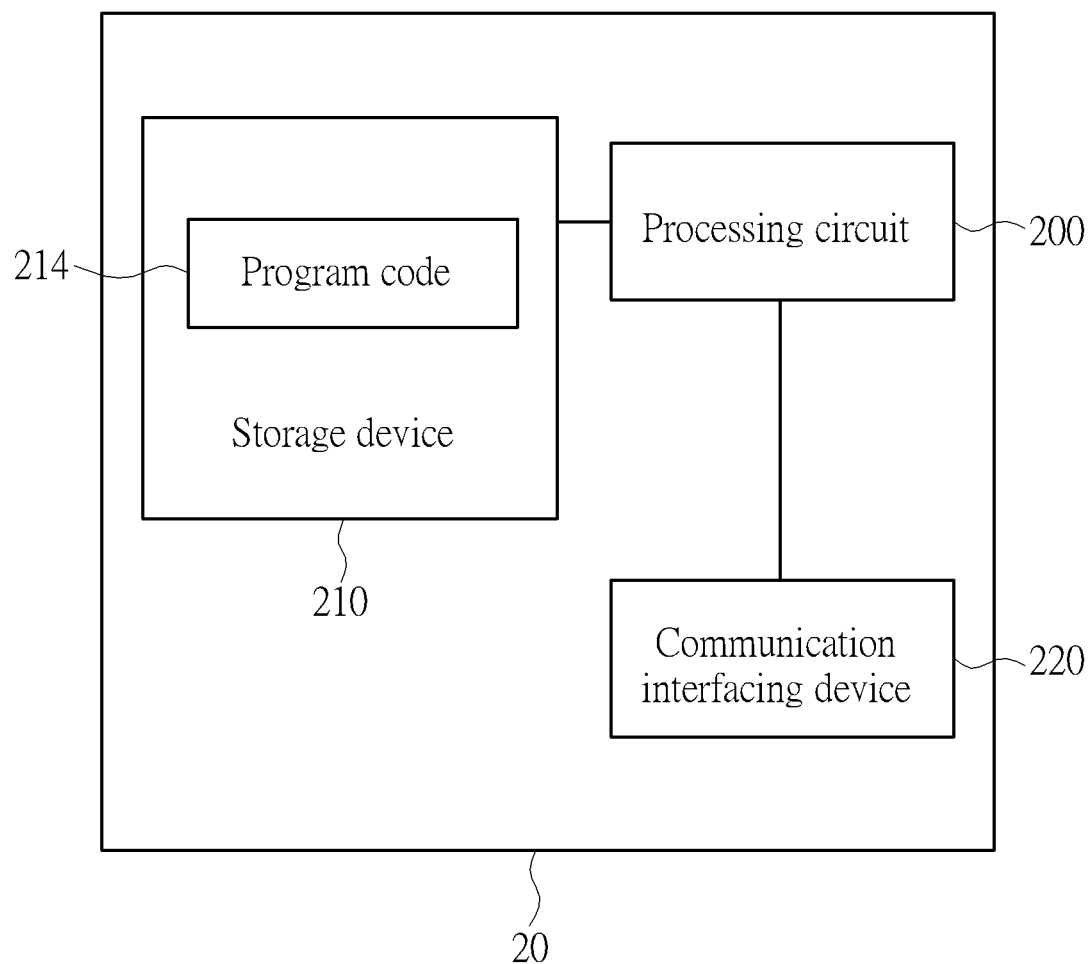
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The communication interfacing device 220 is preferably a transceiver and is used to transmit and receive signals (e.g., data, messages and/or packets) according to processing results of the processing circuit 200.

In one example, the network operates in a high frequency band (e.g., higher than 20 GHz). The network may operate multiple (e.g., large number of) antenna elements to perform transmissions and/or receptions with the communication device. Accordingly, the network may realize an advanced communication technique, e.g., beamforming, to communicate with the communication device. The network may provide a service via at least one beam (e.g., for transmissions and/or receptions). Service areas of beams may not overlap or may partially overlap (e.g., in a spatial domain). A service area of the network may be constructed by (or be divided by) at least one beam or at least one beam group where a beam group may include one or more beams.

In one example, spatial parameters (e.g., angle of departure (AoD), angle of arrival (AoA), zenith of departure (ZoD), zenith of arrival (ZoA) and/or other parameters related to beam patterns design) of beams may be different, if service areas of the beams are not (e.g., completely) overlapped. The spatial parameters of the beams may be the same, if the service areas of the beam are (e.g., completely) overlapped. In other words, different beams may be treated as the same beam, if the spatial parameters of the beams can be referred to each other.

Figure 3:
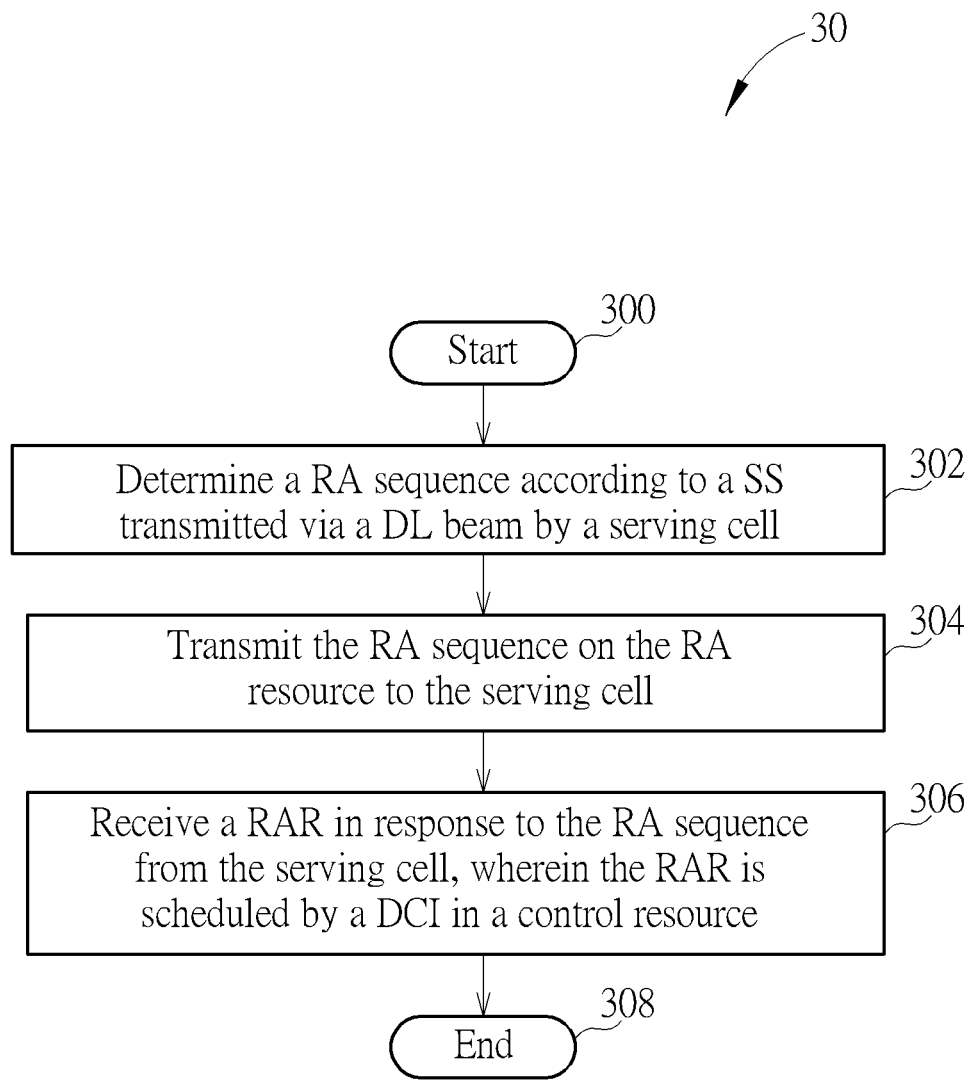
FIG. 3 is a flowchart of a process according to an example of the present invention.

FIG. 3 is a flowchart of a process 30 according to an example of the present invention. The process 30 may be utilized in a communication device shown in FIG. 1, to handle a random access (RA) procedure. The process 30 may be compiled into the program code 214 and includes the following steps:

Step 300: Start.

Step 302: Determine a RA sequence according to a synchronization signal (SS) transmitted via a DL beam by a serving cell.

Step 304: Transmit the RA sequence on the RA resource to the serving cell.

Step 306: Receive a RA response (RAR) in response to the RA sequence from the serving cell, wherein the RAR is scheduled by a DL control information (DCI) in a control resource.

Step 308: End.

According to the process 30, the communication device determines a RA sequence according to a SS (e.g., a SS block) via a DL beam by a serving cell. Then, the communication device transmits the RA sequence on the RA resource to the serving cell, e.g., to perform a RA procedure. Accordingly, the communication device receives a RA response (RAR) in response to the RA sequence from the serving cell, wherein the RAR is scheduled by a DL control information (DCI) in a control resource. That is, a mechanism is provided for the communication device to perform the RA procedure. Thus, the communication device can communicate with the serving cell operated by the network regularly.

Realization of the process 30 is not limited to the above description. The following examples may be applied for realizing the process 30.

In one example, the communication device performs at least one UL transmission with the serving cell, after receiving the RAR.

In one example, the SS comprises at least one of a primary SS (PSS), a secondary SS (SSS), timing information, frequency information and a cell identity (ID) of the serving cell. The communication device may use the SS to obtain a boundary of an orthogonal frequency division multiplexing (OFDM) symbol and/or an error of a carrier frequency operated by the communication device. The communication device may use the cell ID to obtain information of a reference signal for performing a data demodulation and/or information of the beamforming (e.g., beam index). In one example, the SS may be one of at least one SS transmitted by the serving cell. The at least one SS may be transmitted via at least one DL beam by the serving cell. In one example, a SS of the at least one SS may be associated with one of at least one DL transmission beam.

In one example, the communication device determines the RA sequence according to the SS and at least one of system information, a signal quality, information of the DL beam and a capability of the communication device. The above information and parameter(s) may be transmitted via the same resource or different resources, e.g., time resource and/or frequency resource.

In one example, the RA resource is determined (e.g., by the communication device) according to the SS. In one example, the RA resource is determined (e.g., by the communication device) according to the SS and at least one of system information, a signal quality, information of the DL beam and a capability of the communication device. The above information and parameter(s) may be transmitted via the same resource or different resources, e.g., time resource and/or frequency resource.

In one example, a carrier spacing of the RA sequence is determined according to (e.g., configured by) a higher layer signaling (e.g., radio resource control (RRC) signaling).

In one example, the communication device transmits the RA sequence with N repetitions (e.g., N=1, 2, 3, . . . ) on the RA resource. That is, the same RA sequence may be transmitted multiple times to improve the reception performance. The N repetitions may be determined according to a higher layer signaling (e.g., RRC signaling), may be determined according to a mapping table, or may be determined according to at least one signal quality of at least one DL beam. The communication device may transmit the RA sequence with the N repetitions via at least one UL beam. It should be noted that N=1 means that no repetition is used.

In one example, the communication device determines a RA response (RAR) window and a RA-radio network temporary identifier (RA-RNTI), e.g., according to the RA sequence. Then, the communication device receives the RAR in the RAR window according to the RA-RNTI (e.g., by performing a blind detection). It should be noted that the communication device may determine a RA preamble index (RAPID) according to the RA sequence. Then, the communication device performs the at least one UL transmission with at least one timing advanced (TA) command according to at least one UL grant associated to the RAPID. In one example, a search space for the communication device to receive/monitor the RAR is determined according to a higher layer signaling (e.g., RRC signaling), the RA sequence and/or a RA resource. For example, a first search space of the RAR is used when the communication device is capable of performing advanced communication technique(s) (e.g., transmit beamforming and/or receive beamforming), and a second search space of the RAR is used when the communication device is not capable of performing the advanced communication technique(s).

In one example, the DCI is received according to a reference signal determined according to at least one of the SS and a higher layer signaling (e.g., RRC signaling). In one example, the DCI is received according to a reference signal which is the same as another reference signal for receiving system information. That is, the same reference signal is used for receiving the DCI and the system information. In one example, the DCI is received according to a reference signal which is the same as another reference signal for receiving at least one of a UL grant DCI (e.g., for the transmission of Message 3 (Msg 3)) and a DL assignment DCI (e.g., contention resolution or Message 4 (Msg 4)) during the RA procedure. That is, the same reference signal is used for receiving the DCI for scheduling the RAR, the UL grant DCI and/or the DL assignment DCI during the RA procedure. The UL grant DCI may be a DCI for scheduling a UL transmission (e.g., physical UL shared channel (PUSCH)), and the DL assignment DCI may be a DCI for scheduling a DL reception (e.g., physical DL shared channel (PDSCH)). In one example, the DCI is received according to a reference signal which is the same as another reference signal for receiving another DCI for scheduling system information. That is, the same reference signal is used for receiving the DCI and the other DCI for the system information.

In one example, the control resource is determined according to (e.g., configured by) at least one of a higher layer signaling, the RA sequence and the RA resource. In one example, the RA resource is determined (e.g., by the communication device) according to the SS. In one example, the RA resource is determined (e.g., the communication device) according to the SS and at least one of system information, a signal quality, information of the DL beam and a capability of the communication device.

In one example, the RAR includes at least one UL grant for scheduling at least one UL transmission. In one example, the at least one UL transmission is performed in contiguous time-domain resources or noncontiguous time-domain resources. In one example, two set of RA sequences may be configured by the network, wherein the first set of RA sequences may be selected by the communication device capable of operating advanced communication technique(s) and the second set of RA sequences may be selected by the communication device not capable of operating the advanced communication technique(s). For example, a coverage area of the RAR scheduled for the communication device not capable of performing the advanced communication technique(s) should be considered, to ensure that the communication device can receive the RAR correctly.

In one example, the communication device determines a preamble index (RAPID) according to the RA sequence. Then, the communication device performs at least one UL transmission with the serving cell according to at least one UL grant associated to the RAIPID RAPID, after receiving the RAR.

In one example, the communication device reports a preferred DL transmission beam index or a suitable DL transmission beam index in the at least one UL transmission (e.g., Msg 3) to the serving cell.

In one example, a beam (e.g., DL beam or UL beam) is formed by at least one antenna port of the serving cell. In one example, a DL beam is one of a plurality of DL beams of the serving cell for DL transmission. In one example, a UL beam is one of a plurality of UL beams of the serving cell for UL reception.

In one example, a beam (e.g., DL beam or UL beam) is formed by at least one antenna port of the communication device. In one example, a DL beam is one of a plurality of DL beams of the communication device for DL reception. In one example, a UL beam is one of a plurality of UL beams of the communication device for UL transmission.

In one example, the DL beam is for receiving at least one of the SS and/or system information. That is, the communication device determines that the DL beam for receiving the RAR is the same with the DL beam for receiving the SS and/or the system information. In one example, the DL beam is for receiving at least one of a UL grant DCI (e.g., Msg 3) and/or a DL assignment DCI (e.g., contention resolution or Msg 4) during the RA procedure. That is, the communication device determines that the DL beam for receiving the RAR is the same with the DL beam for receiving the UL grant DCI and/or DL assignment DCI. The UL grant DCI may be a DCI for scheduling a UL transmission (e.g., PUSCH), and the DL assignment DCI may be a DCI for scheduling a DL reception (e.g., PDSCH). In one example, the DL beam is for performing a measurement. That is, the communication device determines that the DL beam for receiving the RAR is the same with the DL beam for performing the measurement. In one example, a same UL beam is for transmitting the RA sequence and for performing a UL transmission (e.g., Msg 3). That is, the communication device determines that the UL beam for transmitting the RA sequence is the same with the UL beam for performing the UL transmission (e.g., Msg 3). In other words, reception (or transmission) of different signals with the same beam may represent that these signals are received (or transmitted) via antenna ports with the same spatial parameters.

The following examples may be applied to the above description. At least one TA command and/or at least one transmission power control (TPC) command for the at least one UL transmission may be different. The at least one UL transmission may be associated with different hybrid automatic repeat request (HARQ) process IDs. At least one RNTI value (e.g., temporary cell-RNTI (TC-RNTI)) may be different for the at least one UL transmission. At least one transport block size scheduled for the at least one UL transmission may be the same. At least one UL physical resource reserved for the at least one UL transmission may be the same for the RAR. At least one UL physical resource reserved for the at least one UL transmission may be contiguous or not contiguous in a time domain. As can be seen, the same or different TA command(s), TPC command (s), HARQ process number and TC-RNTI may be applied to the at least one UL transmission.

Figure 4:
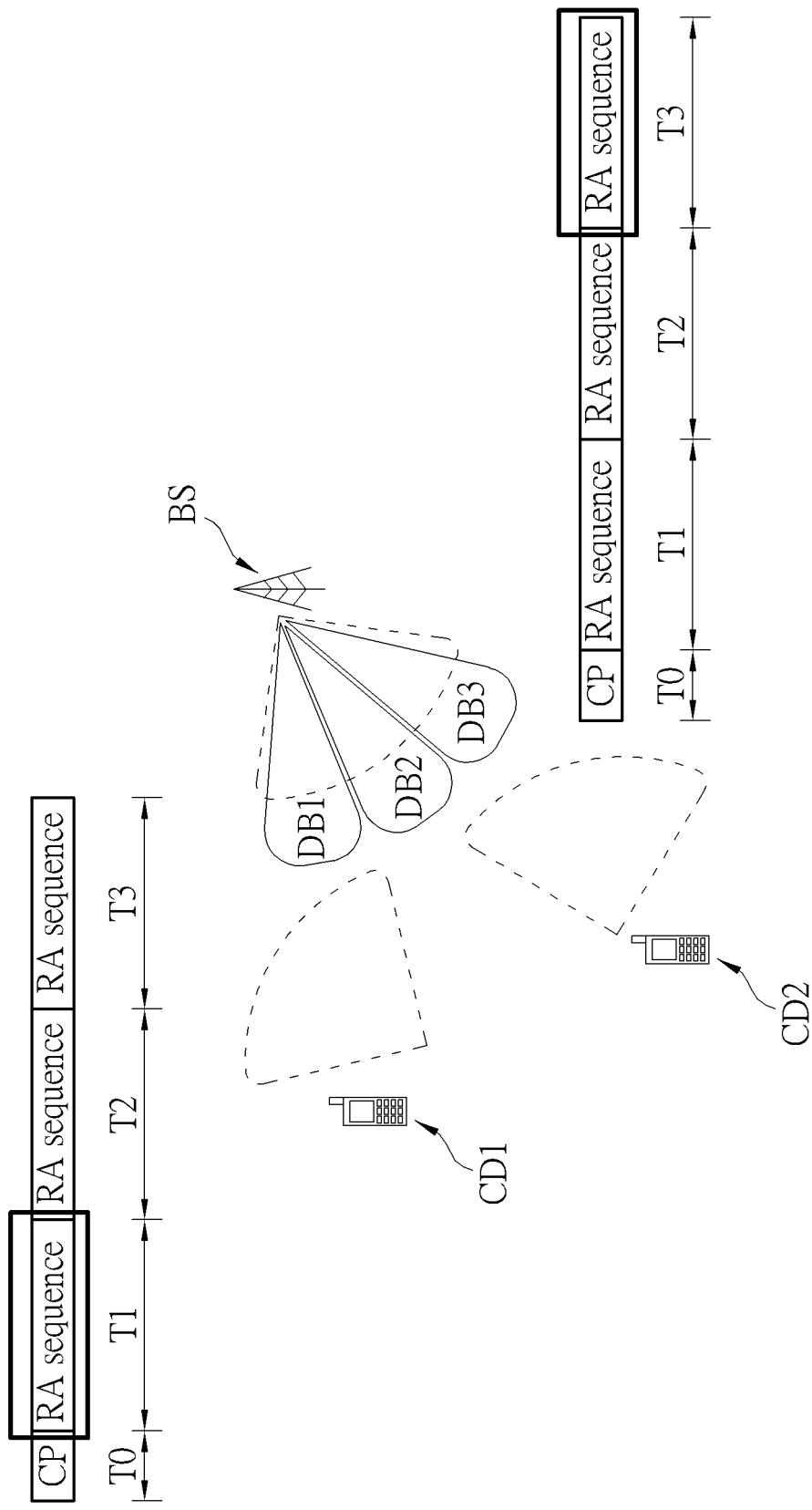
FIG. 4 is a schematic diagram of transmissions of RA sequences according to an example of the present invention.

FIG. 4 is a schematic diagram of transmissions of RA sequences according to an example of the present invention. A BS communicates with two communication devices CD1-CD2 via DL beams DB1-DB3 of a serving cell according to a beamforming. The BS may sweep the DL beams DB1-DB3 sequentially in time intervals T1-T3. The BS may only receive signals via the DL beams DB1-DB3 in the time intervals T1-T3, respectively. According to locations of the communication devices CD1-CD2, the communication devices CD1-CD2 are with coverage areas of the DL beams DB1 and DB3, respectively. In the present example, the communication device CD1 transmits a cyclic prefix (CP) in a time interval T0 and a first RA sequence with 3 repetitions in the time intervals T1-T3 to the BS. Similarly, the communication device CD2 transmits a CP in a time interval T0 and a second RA sequence with 3 repetitions in the time intervals T1-T3 to the BS, wherein the first RA sequence and the second RA sequence may be the same or different.

According to the operation of the BS can only receive the first repetition of the first RA sequence in the time interval T1, and can only receive the third repetition of the second RA sequence in the time interval T3. That is, the BS simply cannot detect/receive the other repetitions of the first RA sequence in the time intervals T2-T3, and cannot detect/receive the other repetitions of the second RA sequence in the time intervals T1-T2. Thus, the RA sequences from different communication devices are separated, i.e., do not interfere with each other.

It should be noted that a RA sequence with and without a CP may be multiplied with a different orthogonal cover code (OCC), to be applied to the above examples. In one example, a RA sequence may be Zadoff-Chu (ZC) sequence or a M-sequence (i.e., maximum length sequence), but is not limited herein. In one example, a DL beam in the above examples (e.g., FIG. 3 and/or FIG. 4) may be replaced by a DL beam group including one or more DL beams.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module (s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and method for handling a RA procedure. Solutions for transmitting and receiving RA sequences are proposed. Thus, a communication device can perform a RA procedure with a network, when a beamforming is realized by the network. As a result, the communication device can communicate with a serving cell operated by the network regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a random access (RA) procedure, comprising:
   a storage device, for storing instructions of:
      determining a RA sequence according to a synchronization signal (SS) transmitted via a downlink (DL) beam by a serving cell, wherein the communication device determines the RA sequence according to the SS, system information and a signal quality;
      transmitting the RA sequence on a RA resource to the serving cell; and
      receiving a RA response (RAR) in response to the RA sequence from the serving cell, wherein the RAR is scheduled by a DL control information (DCI) in a control resource;
      wherein a carrier spacing of the RA sequence is determined by the communication device according to a first higher layer signaling transmitted by a network;
      wherein the DCI is received by the communication device according to a reference signal determined according to the SS; and
   a processing circuit, coupled to the storage device, configured to execute the instructions stored in the storage device.

2. The communication device of claim 1, wherein the storage device further stores an instruction of:
performing at least one uplink (UL) transmission with the serving cell, after receiving the RAR.

3. The communication device of claim 1, wherein the SS comprises at least one of a primary SS (PSS), a secondary SS (SSS), timing information, frequency information and a cell identity (ID) of the serving cell.

4. The communication device of claim 1, wherein the communication device determines the RA sequence according to the SS, the system information, the signal quality and at least one of information of the DL beam and a capability of the communication device.

5. The communication device of claim 1, wherein the RA resource is determined by the communication device according to the SS, or is determined by the communication device according to the SS and at least one of the system information, the signal quality, information of the DL beam and a capability of the communication device.

6. The communication device of claim 1, wherein the communication device transmits the RA sequence with N repetitions on the RA resource.

7. The communication device of claim 6, wherein the N repetitions is determined by the communication device according to a second higher layer signaling, is determined by the communication device according to a mapping table, or is determined by the communication device according to at least one signal quality of at least one DL beam.

8. The communication device of claim 6, wherein the communication device transmits the RA sequence with the N repetitions via at least one UL beam.

9. The communication device of claim 1, wherein the storage device further stores instructions of:
determining a RA response (RAR) window and a RA-radio network temporary identifier (RA-RNTI); and
receiving the RAR in the RAR window according to the RA-RNTI.

10. The communication device of claim 1, wherein the reference signal is determined by the communication device according to the SS and a second higher layer signaling.

11. The communication device of claim 1, wherein the reference signal is the same as another reference signal for receiving the system information.

12. The communication device of claim 1, wherein the reference signal is the same as another reference signal for receiving at least one of a UL grant DCI and a DL assignment DCI during the RA procedure.

13. The communication device of claim 1, wherein the reference signal is the same as another reference signal for receiving another DCI for scheduling the system information.

14. The communication device of claim 1, wherein the control resource is determined by the communication device according to a second higher layer signaling.

15. The communication device of claim 1, wherein the RAR comprises at least one UL grant for scheduling at least one UL transmission.

16. The communication device of claim 1, wherein the storage device further stores the instructions of:
determining a preamble index (RAPID) according to the RA sequence; and
performing at least one UL transmission with the serving cell according to at least one UL grant associated to the RAPID, after receiving the RAR.

17. The communication device of claim 1, wherein the DL beam is for receiving at least one of the SS and the system information.

18. The communication device of claim 1, wherein the DL beam is for receiving at least one of a UL grant DCI and a DL assignment DCI during the RA procedure.

19. The communication device of claim 18, wherein the DL assignment DCI is for contention resolution.

20. The communication device of claim 1, wherein the DL beam is for performing a measurement.

21. The communication device of claim 1, wherein the DL beam is one of a plurality of DL beams of the serving cell.

22. The communication device of claim 1, wherein the DL beam is formed by at least one antenna port of the serving cell.

23. The communication device of claim 1, wherein the serving cell transmits another SS via the DL beam.

24. The communication device of claim 1, wherein the serving cell transmits another SS via another DL beam.

* * * * *